United States Patent Office 2,708,344
Patented May 17, 1955

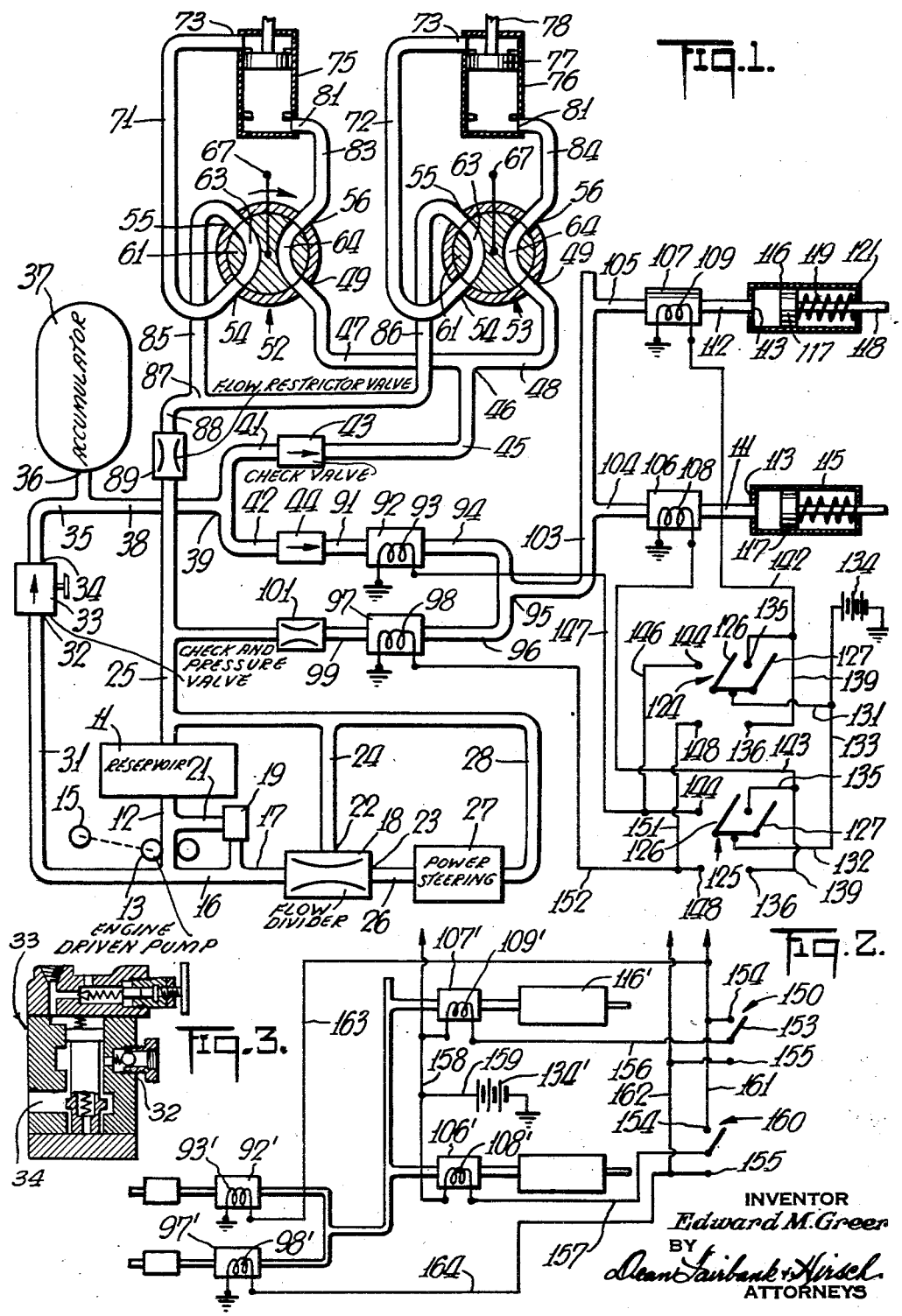

2,708,344
HYDRAULIC EQUIPMENT

Edward M. Greer, Great Neck, N. Y., assignor to Greer Hydraulics, Inc., a corporation of New York Application December 11, 1952, Serial No. 325,320

7 Claims. (Cl. 60—51)

As conducive to an understanding of the invention, it is noted that where the steering of an automobile is controlled by a power steering unit which is supplied with fluid under pressure from a pump driven by the automobile engine, and the power steering unit requires a minimum flow of fluid per unit time in order to operate; the engine, at idling speed, must deliver such minimum quantity. Consequently, at speeds of the engine above idling, fluid is available in excess of the quantity required to operate the power steering unit and where such excess fluid is diverted directly back to the reservoir supplying the pump, the system is inefficient in that it is not being used to the full extent of its capabilities.

It is accordingly among the objects of the invention to provide a hydraulic system for an automobile which may readily be incorporated in a conventional power steering unit system with but few simple modifications thereof and which will utilize the excess fluid from the pump of the power steering unit to actuate various movable components of the automobile including but not limited to the windows, hood and seat without requiring any additional power from the automobile engine other than that required to operate the power steering unit and without in any way affecting the operation of such power steering unit.

According to the invention, the output of the pump of the power steering unit is fed to both the input of the power steering unit and to a pressure accumulator to charge the latter, and means are provided to cut off flow to the accumulator when the pressure therein has risen to a predetermined amount. The accumulator supplies a plurality of hydraulically operated actuators which are controlled by suitable valves and the return line of said accumulator operated system is fed back to the reservoir of the power steering unit.

This application is a continuation-in-part of copending application, Serial No. 56,775, filed October 27, 1948, now Patent No. 2,622,400, dated December 23, 1952.

In the accompanying drawing in which are shown one or more of various possible embodiments of the several features of the invention, Fig. 1 is a diagrammatic view showing one embodiment of the invention, Fig. 2 is a view similar to Fig. 1 of another embodiment thereof, and Fig. 3 is a sectional view of a conventional combined check and pressure valve.

Referring now to the drawing, the hydraulic control equipment shown in Fig. 1 desirably comprises a reservoir 11 for a suitable liquid such as oil, which is connected by line 12 to the inlet of a pump 13 which desirably is driven by a suitable transmission (not shown) illustratively from the fan shaft 15 driven by the automobile engine.

The outlet of pump 13 is connected by line 16 to the inlet of a conventional flow divider unit 18 and also to the inlet of a pressure relief valve 19, the outlet of which is connected by line 21 to line 12. The flow divider 18 desirably has two outlets 22 and 23, the former being connected by line 24 to the return line 25 of reservoir 11, and the latter being connected by line 26 to the inlet of a hydraulic power steering unit 27 of conventional open center type such as that put out by Chrysler Corporation. The outlet of unit 27 is connected by line 28 to return line 25 of the reservoir 11.

In the illustrative embodiment herein shown, the power steering unit 27 requires a constant fluid input of say one and one-half gallons per minute under all conditions of operation, i. e., whether the automobile engine is idling or at full speed. The flow divider unit 18 is designed to pass only one and one-half gallons per minute to the outlet 23 thereof, regardless of the quantity of oil forced by pump 13 into its inlet 17 and all oil in excess of one and one-half gallons per minute will be by-passed to outlet 22 to be returned to reservoir 11 through lines 24 and 25.

The output of oil from pump 13 is proportional to the rate of rotation thereof and hence to the rate of rotation of the automobile engine and is designed, in the embodiment herein shown, to deliver a minimum of one and one-half gallons per minute when the engine is idling and say seven gallons per minute at a rate of rotation equivalent to a speed of sixty miles per hour. Thus, at all speeds greater than idling, the pump 13 will deliver a greater quantity of oil than is required to operate the power steering unit to steer the automobile.

The equipment and circuit thus far described per se form no part of this invention as it is conventional.

According to the invention, the outlet of pump 13 in addition to being connected to the flow divider 18 is also connected by charging line 31 to the inlet 32 of a combined check and pressure valve 33 of conventional type such as that shown in Fig. 3. As the operation of such valve is well known to those skilled in the art, it will not be described. The outlet 34 of valve 33 is connected by line 35 to the oil port 36 of a conventional pressure accumulator 37 such as of the type put out by Greer Hydraulics, Inc.

In the illustrative embodiments herein shown, when the accumulator is fully charged, the pressure on the fluid therein will be 300 p. s. i. and the valve 33 is designed to close at such pressure to prevent further charging of fluid into the accumulator from the pump 13.

The oil port 36 of the accumulator is desirably connected by line 38 to junction 39 which, through branch lines 41 and 42 is connected to the inlets of one way check valves 43 and 44 respectively, said valves being designed to permit flow of fluid therethrough only in the direction indicated by the arrows. The outlet of valve 43 is connected by line 45 to junction 46 which is connected by branch lines 47 and 48 to inlet ports 49 of the identical three way selector valves 52 and 53 respectively, which desirably have an operating position, a return position and an off position. In addition to the port 49, each of the valves 52 and 53 has two hydraulic cylinder control ports 54, 56 and an outlet port 55 and each valve has a rotatable valve member 61 with a pair of arcuate passageways 63, 64 therein.

The rotatable members 61 upon actuation by an associated handle 67 are designed in operating position to connect ports 49, 56 and 54, 55 by means of passageways 64, 63. In return position of the valves, the passageways 64 and 63 connect ports 49, 54 and 55, 56 respectively. In off position, all the ports are sealed as the ends of the passageways are positioned between the ports.

Ports 54 of valves 52, 53 are connected respectively by lines 71, 72 to ports 73 of a pair of identical hydraulically operated actuators, illustratively hydraulic cylinders 75, 76. Each cylinder 75, 76 has a piston 77 slidably mounted therein which has a piston rod 78 connected thereto at one end and at its other end to the unit to be operated, such as the roof of a convertible type automobile and the sliding front seat of the automobile respectively. As the transmission from the piston rod to the roof and seat respectively is of conventional type, it will not be described.

In addition to the ports 73 in the cylinders 75, 76 respectively, which are positioned on one side of the piston 77 therein, each cylinder has a port 81 positioned on the other side of said piston and connected by lines 83, 84 respectively, to ports 56 of valves 52, 53.

The ports 55 of said valves are connected respectively by branch lines 85, 86 to junction 87 and junction 87 is connected by line 88 through flow restrictor valve 89 to return line 25.

The flow restrictor valve 89 controls the rate of flow of the oil from cylinders 75, 76 through the ports 73 or 81 thereof when the valve member 61 is in operating position shown or in return position, thereby controlling the rate of movement of the car roof or seat as the case may be to either of these extreme positions.

The outlet of check valve 44 is connected by line 91 to the inlet of solenoid operated invlet valve 92, which desirably is controlled by a coil 93 and normally is in closed position when the coil is not energized. The outlet of valve 92 is connected by branch line 94 to junction 95 to which is connected by branch line 96 the inlet of solenoid operated discharge valve 97 which also is controlled by a coil 98 and normally is in closed position when the coil is not energized. The outlet of valve 97 is connected by line 99 through flow restrictor 101 to return line 25.

Junction 95 is connected by line 103 and lines 104, 105 to the inlets of solenoid operated control valves 106, 107 respectively, each of said valves being controlled by a coil 108, 109 and normally being in closed position when the coils are not energized.

The outlets of valves 106, 107 are connected by lines 111 and 112 respectively to ports 113 in identical hydraulic cylinders 115 and 116. Each cylinder has a piston 117 slidably mounted therein having a piston rod 118 affixed at one end thereto and at its other end for example, to the window of the automobile. Desirably a coil spring 119 in each of said cylinders is compressed between the piston 117 and the end 121 of the cylinder normally urging the piston 117 to retracted position to close the window.

In order to control the operation of the valves 92, 97, 106, 107 to open and close the windows controlled by the cylinders 115, 116 the electric circuit shown in Fig. 1 is desirably provided. The circuit desirably comprises a plurality of double pole, double throw switches of the neutral center spring return type, two of said switches corresponding to the number of cylinders 116, 117 being illustratively shown and designated 124, 125.

The movable arms 126, 127 of switches 124, 125 are desirably connected respectively by leads 131, 132 to lead 133 which is connected to the positive side of battery 134, desirably the automobile battery, the other or negative side of which is connected to ground as is one side of each of the coils 93, 98, 108 and 109.

The fixed contacts 135, 136 of each of the switches 124, 125 are connected together respectively by leads 139 and the leads 139 are connected respectively by leads 142, 143 to coils 109 and 108 of valves 107 and 106 respectively.

The fixed contacts 144 of switches 124, 125 are connected together by lead 146 which in turn is connected by lead 147 to coil 93 of valve 92 and the fixed contacts 148 of switches 124, 125 are connected together by lead 151 which in turn is connected by lead 152 to the coil 98 of valve 97.

*Operation*

In the operation of the equipment shown in Fig. 1, when the driver of the automobile starts the engine, the pump 13 will be rotated to force oil from reservoir 11 through lines 12, 16 and 31 to the inlet 17 of the flow divider 18 and the inlet valve 32 of valve 33. At idling speed of the motor, only one and one-half gallons per minute of fluid will be forced through the line 12 and portions of this fluid will go to the flow divider 18 and valve 33. Although insufficient fluid will initially be available to operate the power steering unit by reason of the flow of some of the output of the pump to valve 33, as the accumulator 37 connected to valve 33 will quickly charge in but a few seconds, a pressure of 300 p. s. i. will be exerted against the fluid in line 35 to close valve 33. Consequently the entire one and one-half gallons output of the pump 13 will then flow through the flow divider 18 into the power steering unit 27 so that the wheels of the automobile may be turned.

When the automobile engine is speeded up during normal driving, the pump 13 will deliver more than the one and one-half gallons per minute required to operate the power steering unit and the excess fluid will be by-passed through outlet 22 of the flow divider 18 through lines 24 and 25 back to the reservoir.

When the steering wheel is turned, the operation of the power steering unit will cause the back pressure in line 16 to build up. The valve 19 will relieve such pressure if it increases above a predetermined amount.

If the driver of the automobile should desire to raise the roof thereof, he need merely by operating handle 67 of valve 52, move the rotatable member 61 from closed position to the position shown in Fig. 1. As a result, fluid will flow from accumulator 37 through port 36 into lines 35 and 38. As valve 33 also functions as a check valve to permit flow only in the one direction indicated by the arrow, no fluid will pass therethrough. Consequently, the fluid from accumulator 37 will flow through line 38, junction 39, line 41, check valve 43, line 45, junction 46, line 47, port 49 of valve 52, passageway 64, port 56, line 83 into port 81 of cylinder 75 to move the piston 77 to the position shown, thereby raising the roof of the automobile. The fluid on the other side of piston 77 of cylinder 75 will be forced through port 73, line 71, port 54 of valve 52, passageway 63, port 55, line 85, junction 87, line 88 through flow restrictor valve 89 to return line 25 to reservoir 11. By reason of the flow restrictor 89, the roof of the automobile will be raised at a relatively slow speed to prevent injury thereto. After the roof has been raised, the valve 52 may then be moved to closed position. To lower the roof the rotatable member of valve 52 is rotated by handle 67 so that passageways 63 and 64 connect ports 55, 56 and 49, 54 respectively. As a result, the fluid from the accumulator will be directed through line 71 into port 73 of cylinder 75 to move the piston therein, thereby lowering the roof, the fluid in cylinder 75 on the other side of the piston 77 therein being forced through port 81, line 83, port 56, passageway 64, port 55 and through lines 85, 88 and 25 to reservoir 11, the flow restrictor in line 88 controlling the speed of closing of the roof.

As the operation of the selector valve 53 controlling the automobile seat is identical to that of valve 52, it will not be described.

To actuate any one of the hydraulic cylinders 115, 116 to open a window, the movable arms 126, 127 of switch 124, for example, which are normally in intermediate position are moved to engage fixed contacts 144 and 135. As a result a circuit will be completed from battery 134, leads 133 and 131, contact arm 127, contact 135, lead 142, to coil 109 of valve 107 to open said valve. In addition, a circuit will be completed from battery 134, leads 133 and 131, contact arm 126, contact 144, leads 146 and 147 to coil 93 of valve 92 to open said valve.

Due to the opening of valves 92 and 107, fluid under pressure will flow from pressure accumulator 37 through port 36, line 38, junction 39, line 42, one-way valve 44, line 91, valve 92, line 94, junction 95, lines 103 and 105, valve 107, line 112 into the port 113 of cylinder 116 to move the piston 117 therein to window opening position against the tension of coil spring 119. To close the window it is merely necessary to move contact arms 126, 127 of switch 124 to engage fixed contacts 148, 136. As a result, a circuit will be completed from battery 134, leads 133 and 131, contact arm 127, contact 136, leads 139 and 142 to the coil 109 of valve 107 to open said valve. In addition, a circuit will be completed from battery 134, leads 133 and 131, contact arm 126, contact 148, leads 151 and 152 to the coil 98 of valve 97 to open said valve.

Due to the opening of valves 107 and 97, the fluid in cylinder 116 will be forced through port 113 by the tension of coil spring 119 against piston 117 and thence through line 112, valve 107, lines 105, 103, junction 95, line 96, valve 97, line 99, flow restrictor 101 and return line 25 to reservoir 11. By reason of the movement of piston 117 of cylinder 116, the window controlled thereby will be closed, the restrictor 101 controlling the speed of such closing by limiting the rate of flow of fluid through line 99.

At any stage in the opening or closing of the window controlled by cylinder 116, the switch 124 can be moved to intermediate position, to close valves 107 and 92 or 97. Consequently, no fluid can flow into or out of cylinder 116 and the window can be set at any desired position.

As the operation of the switch 125 controlling cylinder 115 is identical to that of switch 124, it will not be described.

It is of course to be understood that additional branch lines can be connected to junction 46 and each of such branch lines could have a selector valve similar to valves 52, 53 and a hydraulic cylinder similar to cylinders 75, 76 to operate other movable elements such as the trunk door. It is also to be understood that additional branch lines could be connected to line 103 and each of such lines could have a solenoid operated valve and cylinder therein to operate other windows for example.

If the car should be at rest with the engine shut off, the valve 33 will prevent flow from the accumulator 37 to the flow divider 18 and the accumulator will remain charged so that the roof, the seat and the windows can still be operated.

If at any time during operation of the automobile the pressure in the accumulator should fall below say 300 p. s. i., for example, as would occur if a window was operated, the valve 33 would instantly open due to the reduced pressure in line 35 to permit recharging of the accumulator by the excess flow above one and one-half gallons per minute from pump 13 due to any engine speed above idling.

If, due to the operation of one of the hydraulic cylinders when the engine is shut off, the pressure in the accumulator should fall below 300 p. s. i. although the valve 33 would open, no fluid would pass therethrough as such valve only permits flow of oil therethrough from pump 13. As the hydraulic cylinders are designed to operate at a pressure considerably less than 300 p. s. i., they can be actuated many times before the accumulator pressure drops too low.

The electric control circuit shown in Fig. 2 may be used in place of the one shown in Fig. 1 to operate the respective solenoid valves of the system and parts corresponding to those in Fig. 1 have the same reference numerals primed.

The circuit of Fig. 2 desirably comprises a pair of single pole double throw switches 150, 160 of the spring neutral center return type, each having a movable arm 153 and a pair of fixed contacts 154, 155.

The movable arms 153 of switches 150 and 160 are connected by leads 156, 157 respectively to one side of the coils 109′ and 108′ of solenoid valves 107′ and 106′ respectively. The other sides of said coils are connected by leads 158, 159 to one side of battery 134′, the other side of which is connected to ground.

Fixed contacts 154, 155 of switches 150, 160 are connected together by lead 161, 162 respectively, which in turn are connected by leads 163, 164 to one side of coils 93′, 98′ of valves 92′ and 97′, the other sides of said coils being connected to ground.

In the operation of the circuit shown in Fig. 2, if the arm 153 of switch 150 is moved against fixed contact 154, a circuit is completed from ground, through battery 134′, leads 159, 158, coil 109′ of valve 107′, lead 156, arm 153, contact 154, lead 163, coil 93′ of valve 92′ to ground. As a result, valves 107′ and 92′ will open to function as previously described with respect to valves 107 and 92 to actuate hydraulic cylinder 116′ to open the associated window.

If arm 153 of switch 150 is moved to engage fixed contact 155, the coils 109′, 98′ of valves 107′ and 97′ will be connected in series with the battery and as a result of the energization of coils 109′ and 98′, valves 107′ and 97′ will open to permit flow of oil from the hydraulic cylinder for closing of the window in the manner previously described.

As the operation of the circuit shown in Fig. 2 controlled by switch 160 is identical to that controlled by switch 150, it will not be described.

As many changes could be made in the above construction, and many apparently widely different embodiments of this invention could be made without departing from the scope of the claims, it is intended that all matter contained in the above description or shown in the accompanying drawing shall be interpreted as illustrative and not in a limiting sense.

Having thus described my invention, what I claim as new and desire to secure by Letters Patent of the United States is:

1. In a hydraulic system of the type comprising a reservoir for fluid, a hydraulic power steering unit, a flow divider, a positive displacement high pressure pump to deliver fluid from said reservoir through said flow divider to said steering unit and a return line from said flow divider and said hydraulic steering unit to said reservoir; the combination therewith of a pressure accumulator having a port, a charging line from said positive displacement high pressure pump to the port of said accumulator, a one-way pressure valve in said charging line having its inlet connected to said pump and its outlet connected to the port of said accumulator, said pressure valve permitting flow only from said pump to said accumulator and having means for setting thereof to prevent flow therethrough when the pressure on the outlet side thereof rises to a predetermined amount, a hydraulically operated actuator, a line connecting said actuator to the port of said accumulator, valve means in said line controlling the operation of said actuator and a return line from said actuator to said reservoir.

2. In a hydraulic system of the type comprising a reservoir for fluid, a hydraulic steering unit, a flow divider, a pump to deliver fluid from said reservoir through said flow divider to said steering unit and a return line from said flow divider and said hydraulic steering unit to said reservoir; the combination therewith of a pressure accumulator having a port, a charging line from said pump to the port of said accumulator, a one-way pressure valve in said charging line, a hydraulic cylinder having a port and having a piston slidable therein, resilient means normally urging said piston to retracted position, a line connecting the port in said accumulator to the port in the hydraulic cylinder, a normally closed control valve in said line for regulating the flow of fluid into and out of the port of said hydraulic cylinder, an inlet valve in said line for regulating flow of fluid through the control valve into the port in said hydraulic cylinder, a second line connected at one end to said line between said valves and at its other end to said return line, and a normally closed discharge valve in said second line, whereby upon opening of the valves in said first line, fluid will flow from said accumulator into the port in said hydraulic cylinder to move the piston therein against the urging of said resilient means and upon opening of the discharge valve in the second line and the control valve in said first line and closing of the inlet valve in said first line, the resilient means will move the piston to retracted position.

3. The combination set forth in claim 2 in which said second line has a flow restrictor therein.

4. The combination set forth in claim 2 in which said resilient means comprises a coil spring positioned in said hydraulic cylinder between one face of the piston and one end of the cylinder and the port in said cylinder is at the opposed end.

5. The combination set forth in claim 2 in which said normally closed valves in the first and second lines are solenoid valves having a coil and switch means are provided for connecting the coils of the valves in the first line to a source of current for operation thereof in one position of the switch and for connecting the coils of the discharge valve and the control valve to a source of current for operation of said valves in another position of said switch.

6. The combination set forth in claim 2 in which said normally closed valves are solenoid valves having a coil and a double pole double throw switch is provided having a pair of movable arms and two pairs of fixed contacts, a battery having one side connected to one side of each of said solenoid coils, and the other side connected to said movable arms, one of the contacts of each of said pairs being connected together and to the other side of the solenoid coil of the control valve and the other contact of each of said pairs being connected respectively to the other side of the solenoid coils of the inlet and discharge valves, whereby in one position of said switch the valves in said first line will be opened and in another position of said switch the control valve in said first line and the discharge valve in said second line will be opened.

7. The combination set forth in claim 2 in which said normally closed valves are solenoid valves having a coil, a single pole double throw switch is provided having a movable arm and a pair of fixed contacts, a battery having one side connected to one side of the solenoid coil of the control valve and the other side connected to one side of the solenoid coil of the inlet valve in the first line and the discharge valve in the second line, the movable arm of said switch being connected to the other side of the solenoid coil of the control valve in the first line and the fixed contacts of said switch being connected respectively to the other sides of the other two solenoid coils of the inlet and discharge valves, whereby in one position of said switch, the valves in said first line will be opened and in another position of said switch the control valve in said first line and the discharge valve in said second line will be opened.

References Cited in the file of this patent
UNITED STATES PATENTS

| | | |
|---|---|---|
| 1,394,245 | Berry | Oct. 18, 1921 |
| 2,264,375 | Hill et al. | Dec. 2, 1941 |
| 2,275,963 | Herman et al. | Mar. 10, 1942 |
| 2,363,977 | Kucher | Nov. 28, 1944 |
| 2,622,400 | Greer | Dec. 23, 1952 |